United States Patent
Seetharamdoo et al.

(10) Patent No.: US 11,050,156 B2
(45) Date of Patent: Jun. 29, 2021

(54) METHOD FOR IMPROVING THE EFFICIENCY OF AN ELECTRICALLY SMALL ANTENNA

(71) Applicant: Université Gustave Eiffel, Marne-la-Vallee (FR)

(72) Inventors: Divitha Seetharamdoo, Marcq en Baroeul (FR); Mhamad-Hassanein Rabah, Villeneuve d'Ascq (FR); Hussein Srour, Villeneuve d'Ascq (FR); Marion Berbineau, Villeneuve d'Ascq (FR)

(73) Assignee: UNIVERSITÉ GUSTAVE EIFFEL, Marne-la-Vallee (FR)

( * ) Notice: Subject to any disclaimer, the term of this patent is extended or adjusted under 35 U.S.C. 154(b) by 285 days.

(21) Appl. No.: 16/311,474

(22) PCT Filed: Jun. 19, 2017

(86) PCT No.: PCT/FR2017/051598
§ 371 (c)(1),
(2) Date: Dec. 19, 2018

(87) PCT Pub. No.: WO2017/220905
PCT Pub. Date: Dec. 28, 2017

(65) Prior Publication Data
US 2019/0237878 A1    Aug. 1, 2019

(30) Foreign Application Priority Data

Jun. 20, 2016    (FR) ...................................... 1655690

(51) Int. Cl.
*H01Q 9/40*    (2006.01)
*H01Q 15/00*    (2006.01)
(Continued)

(52) U.S. Cl.
CPC ............... *H01Q 9/40* (2013.01); *G06F 30/20* (2020.01); *H01Q 5/50* (2015.01); *H01Q 15/0086* (2013.01); *G06F 2111/10* (2020.01)

(58) Field of Classification Search
CPC ...................................................... H01Q 9/40
(Continued)

(56) References Cited

U.S. PATENT DOCUMENTS 8,121,821 B1 * 2/2012 Jones ..................... H01Q 9/28
703/1
2009/0140946 A1 * 6/2009 Ziolkowski ............ H01Q 13/08
343/788

FOREIGN PATENT DOCUMENTS

JP    2002271119    9/2002
JP    2011103629    5/2011
JP    2011160172    8/2011

OTHER PUBLICATIONS

Rabah, M. Hassanein et al., "Analysis of Miniature Metamaterial and Magnetodielectric Arbitrary-Shaped Patch Antennas Using Characteristic Modes: Evaluation of the Q Factor," IEEE Transactions on Antennas and Propagation, vol. 64, No. 7, 2016, pp. 2719-2731.
(Continued)

*Primary Examiner* — Daniel Munoz
(74) *Attorney, Agent, or Firm* — Hamre, Schumann, Mueller & Larson, P.C.

(57) ABSTRACT

A method of improving the efficiency of an electrically small antenna (1), the method comprising the following steps:
  selecting (100) an antenna;
  electrically feeding said selected antenna (1);
  quantifying (110) the energy stored in the selected antenna (1) at a given transmission frequency;
  determining the nature of the antenna (1) as a function of the quantified stored energy, this determination comprising comparing (120) said quantity of stored energy
(Continued)

with an energy threshold, the antenna (1) being of electric nature (130) if the quantified stored energy is below the energy threshold, and otherwise being of magnetic nature (135); and selecting a metamaterial inclusion (2) for associating with the selected antenna (1) in order to improve its efficiency, the selection being made from a list of inclusions as a function of the nature of the selected antenna (1).

10 Claims, 2 Drawing Sheets

(51) Int. Cl.
  *H01Q 5/50* (2015.01)
  *G06F 30/20* (2020.01)
  *G06F 111/10* (2020.01)

(58) Field of Classification Search
  USPC .............................................................. 703/4
  See application file for complete search history.

(56) References Cited

OTHER PUBLICATIONS

Rabah, M. Hassanein et al., "Novel Miniature Extremely-Wide-Band Antenna With Stable Radiation Pattern for Spectrum Sensing Applications," IEEE Antennas and Wireless Propagation Letters, vol. 14, 2015, pp. 1634-1637.

Rabah, M. Hassanein et al., "New Metrics for Artificial Magnetism From Metal-Dielectric Metamaterial Based on the Theory of Characteristic Modes," IEEE Antennas and Wireless Propagation Letters, vol. 15, 2015, pp. 460-463.

International Search Report issued for International Patent Application No. PCT/FR2017/051598, dated Sep. 15, 2017, 7 pages including English translation.

Collardey, S. et al., "Calculation of Small Antennas Quality Factor Using FDTD Method," IEEE Antennas and Wireless Propagation Letters, vol. 5, 2006, pp. 191-194.

Office Action issued for Japanese Patent Application No. 2018-566515, dated Mar. 23, 2021, 4 pages including English translation.

\* cited by examiner

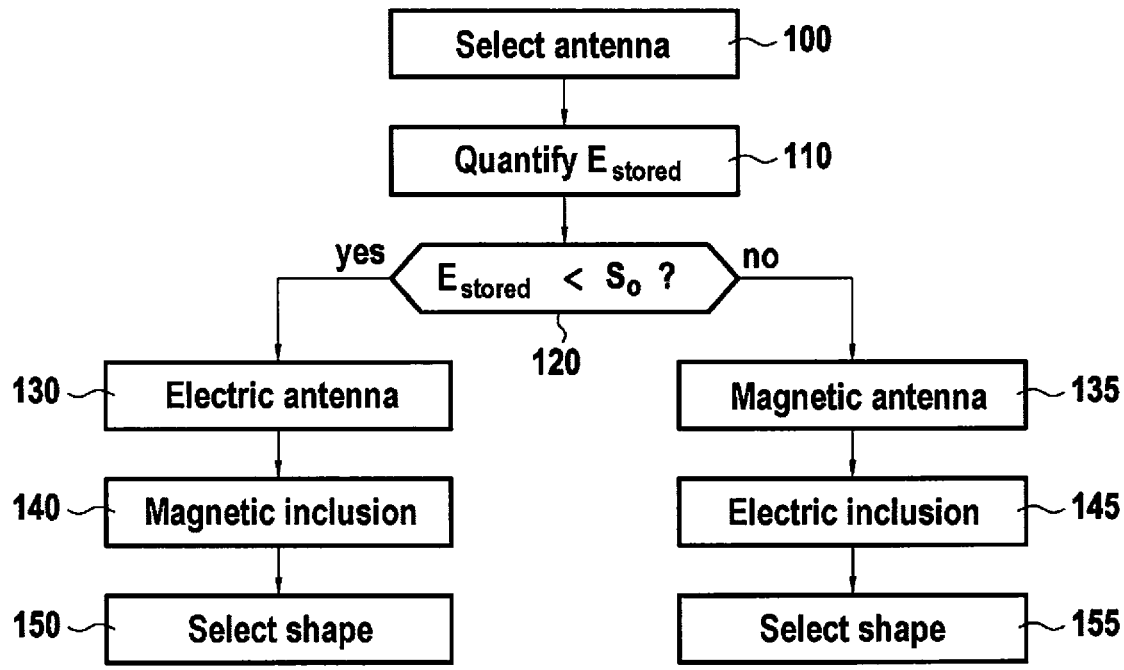
FIG.1
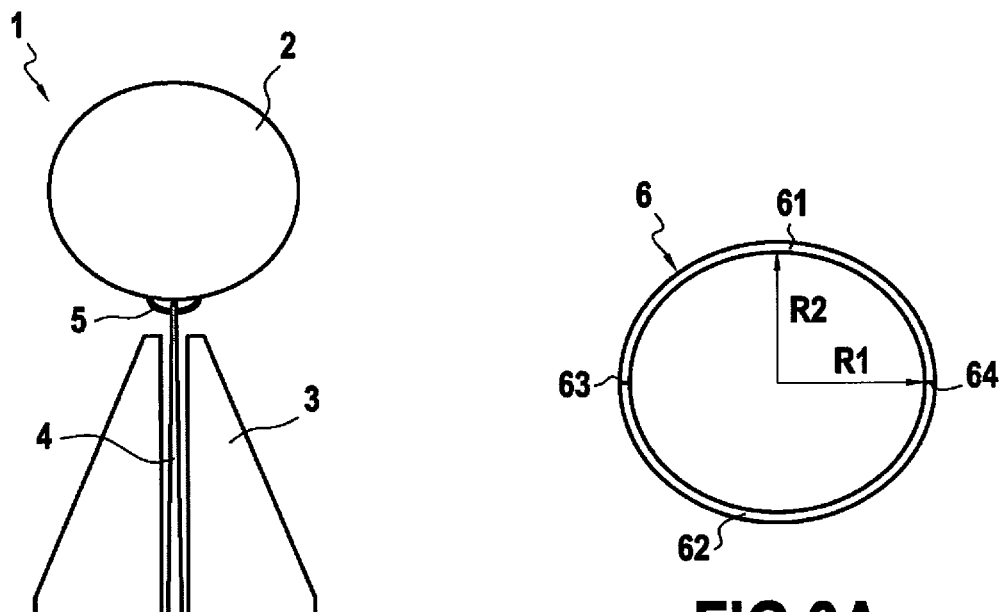
FIG.2
FIG.3A

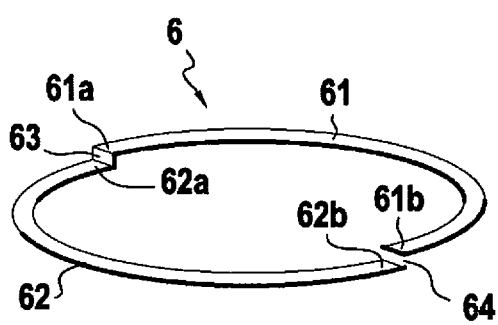
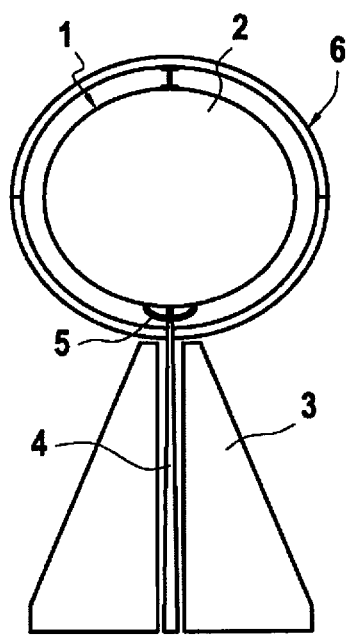
FIG.3B
FIG.4
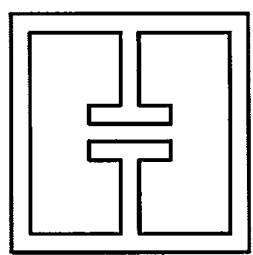
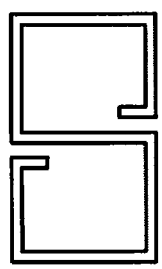
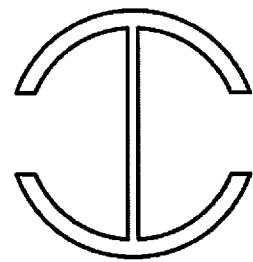
FIG.5A     FIG.5B     FIG.5C
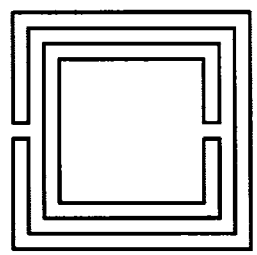
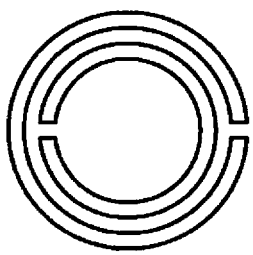
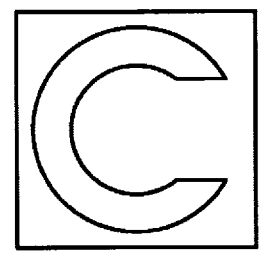
FIG.5D     FIG.5E     FIG.5F

METHOD FOR IMPROVING THE EFFICIENCY OF AN ELECTRICALLY SMALL ANTENNA

BACKGROUND OF THE INVENTION

The invention relates to electrically small antennas, and more particularly to a method of improving the efficiency of an electrically small antenna.

In accordance with H. A. Wheeler's relationship, an antenna is said to be "electrically small" when its maximum dimension is less than $\lambda/\pi$, where $\lambda$ is the wavelength at which the antenna functions, i.e. when its volume is less than a sphere of radius $\lambda/2\pi$, also referred to as the "radiansphere". This definition is equivalent to saying that an antenna is electrically small if it satisfies the condition ka<1, where k is the wave number $2\pi/\lambda$, and a is the radius of the minimum sphere that encompasses the antenna, also known by the term "Chu's sphere".

A "radiansphere" corresponds to the transition distance between the near field in which electromagnetic energy is stored in the antenna and the far field where it is propagated.

This reduction in antenna size relative to electrical wavelength limits the radio performance of antennas.

The performance of an electrically small antenna (ESA) is characterized by its electrical size ka, its Q factor (or bandwidth), and its radiated efficiency $\eta$, which is defined by the ratio of the radiated power divided by the power accepted by the antenna.

Losses in the antenna are modeled by a series loss resistance $R_{loss}$. With $R_{rad}$ being the radiation resistance and $R_A$ the total input resistance, i.e. $R_{rad}+R_{loss}$, the radiated efficiency $\eta$ can be written as follows:

$$\eta = \frac{R_{rad}}{R_{rad} + R_{loss}} = \frac{R_{rad}}{R_A}$$

The reason efficiency becomes smaller for small antenna sizes is not due to conduction losses or dielectric losses, but rather to low radiation resistance due to energy stored around the antenna.

Emerging telecommunications systems relying on smart wireless are becoming more and more widespread, and massive deployment of systems of this type is expected in the coming years. Proper operation of such systems relies, amongst other things, on a spectrum probe unit. Receive antennas for such spectrum probe systems are difficult to design given applications constraints.

Specifically, it is necessary for such electrically small antennas to operate at frequencies that are relatively low (of the order of 600 megahertz (MHz) to 700 MHz) while retaining reasonable dimensions and performance. Unfortunately, miniaturizing an antenna necessarily involves compromises concerning performance, in particular in terms of bandwidth and efficiency.

There exist various electrically small antennas that present characteristics enabling their efficiency to be improved. In particular, Document US 2009/0140946 discloses an electrically small antenna provided with an inclusion of resonant LC type in the near field, i.e. of both electrical and magnetic type since it combines induction and capacitance. That inclusion is said to be "metamaterial-inspired" and it is applied to small electrical and magnetic three-dimensional antennas.

Nevertheless, that document is limited to individual antennas such as dipoles and loops, and their final bandwidth is very small.

OBJECT AND SUMMARY OF THE INVENTION

The invention seeks to solve this particular problem by proposing a method that serves to improve the efficiency of any electrically small antenna from a list of metamaterial inclusions.

The invention firstly provides a method of improving the efficiency of an electrically small antenna, the method comprising the following steps:
  selecting an antenna;
  electrically feeding said selected antenna;
  quantifying the energy stored in the selected antenna at a given transmission frequency;
  determining the nature of the antenna as a function of the quantified stored energy, this determination comprising comparing said quantity of stored energy with an energy threshold, the antenna being of electric nature if the quantified stored energy is below the energy threshold, and otherwise being of magnetic nature; and
  selecting a metamaterial inclusion for associating with the selected antenna in order to improve its efficiency, the selection being made from a list of inclusions as a function of the nature of the selected antenna.

The invention thus makes it possible to select and associate a particular metamaterial inclusion with a given antenna in order to improve its radiation efficiency and thus its overall efficiency.

More particularly, said stored quantity of energy is compared with a zero energy threshold. Said comparison thus corresponds to determining the sign of the value of the quantity of the stored energy.

The energy stored in the antenna can be calculated using various methods, such as for example the method described in the article "Calculation of small antennas quality factor using FDTD method" by Collardey et al. published in 2006 in the IEEE Journal.

Unlike known improved antennas, the method of the invention makes it possible to consider complex antennas as used within telecommunications devices. By way of example, integrating an antenna within the structure of a telephone requires antennas to be used that are of geometrical shape that is particularly irregular.

The analysis and the synthesis proposed by the method of the invention can be applied to a pair comprising an electrically small antenna and a noncanonical and an arbitrary metamaterial inclusion, i.e. in particular an inclusion of size and of nature that can be arbitrary. The method always gives results in terms of the pair of an antenna and a metamaterial inspired inclusion for association therewith in order to improve radiation efficiency.

The method thus makes it possible to improve the performance of an antenna compared with existing antennas, in particular in terms:
  of radiation efficiency;
  of bandwidth (passband);
  of physical dimensions; and
  of stability of its radiation pattern over the entire frequency band.

In a first aspect of the method of improving the efficiency of an electrically small antenna, quantifying the energy stored in the selected antenna comprises decomposing the antenna into surface current modes and estimating the stored energy in the dominant mode only.

The method relies in particular on analysis based on the theory of characteristic modes for evaluating the energy stored in the antenna without an inclusion, for each of the current modes present. In order to quantify the order of magnitude of the energy stored in the antenna, the dominant mode is identified, the dominant mode of an antenna excited by an external electrical feed corresponding to the mode that is associated with the greatest modal weighting, and then the product is calculated of the eigenvalue of the dominant mode multiplied by the square of the associated weighting.

The method consists firstly in defining metrics that are suitable for analyzing an electrically small antenna and a plurality of metamaterial inclusions. Secondly, criteria are proposed for ensuring that the association of the two structures leads to an improvement in the performance of the electrically small antenna in terms of radiation efficiency.

In a variant of the method of improving the efficiency of an electrically small antenna, quantifying the energy stored in the selected antenna comprises decomposing the antenna into frequency excitation modes and estimating the stored energy from the sum of the energies stored in the various modes. Generally for an electrically small antenna, the radiation is due to the dominant mode. Nevertheless, for a more complex, multi-mode antenna, it becomes necessary to consider the sum of the energies stored per mode.

In a second aspect of the method of improving the efficiency of an electrically small antenna, the list of inclusions is previously formed from metamaterial inclusions classified depending on the natures of the inclusions into a first category comprising electric inclusions or into a second category comprising magnetic inclusions.

In a third aspect of the method of improving the efficiency of an electrically small antenna, the inclusions are also listed within each of the first and second categories as a function of their geometrical shapes, and the step of selecting the inclusion further comprises defining the geometrical shape of the antenna, the selection being made as a function of the geometrical shape of the selected antenna.

Classifying the geometrical shapes of the inclusions within each category serves to reduce as much as possible the number of inclusions from which to select the inclusion that is to improve the selected antenna.

In a fourth aspect of the method of improving the efficiency of an electrically small antenna, the nature of the inclusions is previously determined by calculating eigenvalues of the inclusions, an inclusion possessing a magnetic nature if its eigenvalue is positive and an electric nature if it is negative.

The eigenvalues of inclusions may be calculated as a function of the transmission frequencies of the antennas.

In a fifth aspect of the method of improving the efficiency of an electrically small antenna, selecting a metamaterial inclusion from a list of inclusions includes defining the geometrical shape of the antenna, with the selection also being made as a function of the geometrical shape of the antenna.

The invention also proposes a computer system having means configured to implement the above-defined method.

Furthermore, the invention also provides a computer program product that is directly loadable into a memory of a computer system, the product having software code portions for executing the above-defined method when said program is executed on said computer system.

The invention also proposes a medium readable by a computer system and having computer-executable instructions adapted to cause the computer system to execute the method as defined above.

BRIEF DESCRIPTION OF THE DRAWINGS

The invention can be better understood on reading the following description given by way of non-limiting indication and with reference to the accompanying drawings, in which:

FIG. 1 is a flow chart of a method of improving the efficiency of an electrically small antenna in an implementation of the invention;

FIG. 2 shows an example of a planar antenna without an inclusion:

FIGS. 3A and 3B are respectively a face view and a perspective view of a metamaterial inclusion configured to co-operate with the FIG. 2 antenna;

FIG. 4 shows an example of a planar antenna improved by adding a metamaterial inclusion; and FIGS. 5A to 5F show other examples of geometrical shapes for metamaterial inclusions.

DETAILED DESCRIPTION OF IMPLEMENTATIONS

FIG. 1 is a flow chart showing a method of improving the efficiency of an electrically small antenna in an implementation of the invention.

In a first step 100 of the method, an electrically small antenna for improvement is selected. By way of example, the electrically small antenna may be a planar antenna, like the antenna shown in FIG. 2.

In FIG. 2, the planar antenna 1 comprises a radiating portion 2 of elliptical shape serving to transmit waves under electrical excitation, and a feed system 3 serving to convey electrical excitation current to the radiating portion 2, the current being conveyed in particular via a feed channel 4 having its end that is coupled to the radiating portion 2 presenting a feed trident 5 that is coupled to the radiating portion 2 at three distinct points.

The elliptical shape of the radiating portion 2 serves to provide an additional degree of freedom for impedance matching while quantifying energy. The feed trident 5 is used to excite the radiating portion 2 of the antenna 1 at three equidistant points so as to increase the number of modes that are excited and reduce the cutoff frequencies of the first modes.

In a second step 110, the selected antenna 1 is fed and the energy stored in the antenna 1 is quantified.

In order to quantify the stored energy, e.g. using the method of moments, an impedance matrix Z is determined for the radiating portion 2 of the antenna 1 in the presence of an electrical field imposed by the feed system 3 and the feed unit (not shown) to which it is connected. Furthermore, on the basis of the theory of characteristic modes, mode currents are determined, i.e. the currents for each resonant mode of the antenna structure. The mode currents correspond to the eigenvalues of the structure, i.e. of the antenna 1, when it is powered. This calculation is performed on the frequency range of interest or of operation of the antenna 1, e.g. 900 MHz to 1100 MHz.

Thereafter, the dominant mode is identified and then the total reactive power is calculated for the dominant mode(s), in particular on the basis of the product of the eigenvalue of the dominant mode multiplied by the square of the associated weighting. The total reactive power may be defined using the following equation:

$$P_r = \sum_{n=1}^{N} P_{r,n} = \sum_{n=1}^{N} |\alpha_n|^2 \lambda_2$$

where $P_r$ represents the total reactive power, n is the mode index, $\alpha_n$ is the weighting coefficient of the mode n, $\lambda_n$ is the eigenvalue of the mode n, and N is the number of dominant modes under consideration.

Examples of a method for quantifying the energy stored in an electrically small antenna are given in the article "New metrics for artificial magnetism from metal-dielectric metamaterial based on the theory of characteristic modes" by M. H. Rabah et al., published in 2015 in the IEEE journal, and in the article "Calculation of small antennas quality factor using FDTD method", by S. Collardey et al. published in 2006 in the IEEE journal. The contents of those two articles are incorporated in full by reference in the present patent application.

In a third step 120, the sign of the previously calculated stored energy is studied.

If the stored energy is negative, then in a following step 130, the nature of the antenna 1 is said to be "electric". On the contrary, if the stored energy is positive, then in a step 135, the nature of the antenna 1 is said to be "magnetic".

Following step 135, if the antenna 1 is of magnetic nature, then in a step 145, the choice of inclusions from a list of metamaterial inclusions is limited to a first category of inclusions containing electric inclusions.

Following step 130, if the antenna 1 is of electric nature, then in a step 140, the choice of inclusions from a list of metamaterial inclusions is limited to a second category of inclusions combining magnetic inclusions.

Thereafter, in a step 150 following the step 140, or in a step 155 following the step 145, the geometrical shape of the antenna 1, and in particular of its radiating portion 2 is identified, a geometrical group of usable inclusions is defined, and the number of metamaterial inclusions in the category under consideration is reduced so as to define the electric or magnetic inclusion that is best adapted to the antenna 1, thereby optimizing the improvement of the efficiency of the antenna 1.

By way of example, the inclusion for the planar antenna 1 may correspond to the inclusion 6 shown in FIGS. 3A and 3B. The metamaterial inclusion 6 is elliptical in shape, presenting a first radius R1 and a second radius R2, as shown in FIG. 3A.

Furthermore, in order to be able to form a closed ellipse, the inclusion 6 presents a first half-ellipse 61 extending in a first plane a second half-ellipse 62 complementary to the first half-ellipse 61 and extending in a second plane that is distinct from and parallel to the first plane in which the first half-ellipse 61 extends, as shown in FIG. 3B. The first and second half-ellipses 61 and 62 are coupled by a connection 63 formed between a first end of the first half-ellipse 61 arranged facing a first end 62a of the second half-ellipse 62. The second end 61b of the first half-ellipse 61 and the second end 62b of the second half-ellipse 62 placed facing each other and respectively opposite from the first end 61a of the first half-ellipse 61 and the first end 62a of the second half-ellipse 62 are separated by a gap 64.

When the metamaterial inclusion is made on a panel, the connection 63 is in the form of a via serving to connect the first half-ellipse 61 that is formed on a first face of the panel electrically to the second half-ellipse 62 that is formed on a second face of the plane opposite from the first face of the panel.

FIG. 4 shows the planar antenna 1 of FIG. 2 that is improved by adding the metamaterial inclusion of FIGS. 3A and 3B.

FIGS. 5A to 5F show other examples of geometrical shapes for metamaterial inclusions that can be used for other geometrical shapes of electrically small antennas.

The invention thus proposes a method that serves to improve the efficiency of any electrically small antenna by using a series of metamaterial inclusions that have previously been classified in a list, at least as a function of their natures.

The invention claimed is:

1. A method of improving the efficiency of an electrically small antenna, the method comprising the following steps:
   selecting an antenna;
   electrically feeding said selected antenna;
   quantifying the energy stored in the selected antenna at a given transmission frequency;
   determining the nature of the selected antenna as a function of the quantified stored energy, this determination comprising comparing said quantity of stored energy with an energy threshold, the selected antenna being of electric nature if the quantified stored energy is below the energy threshold, and otherwise being of magnetic nature; and
   selecting a metamaterial inclusion for associating with the selected antenna in order to improve its efficiency, the selection being made from a list of inclusions as a function of the nature of the selected antenna.

2. A method according to claim 1, wherein quantifying the energy stored in the selected antenna comprises decomposing the selected antenna into surface current modes and estimating the stored energy in a dominant mode only.

3. A method according to claim 1, wherein quantifying the energy stored in the selected antenna comprises decomposing the selected antenna into frequency excitation modes and estimating the stored energy from a sum of energies stored in the frequency excitation modes.

4. A method according to claim 1, wherein the list of inclusions is previously formed from metamaterial inclusions classified depending on the nature of the inclusions into a first category comprising electric inclusions or into a second category comprising magnetic inclusions.

5. A method according to claim 4, wherein the nature of the inclusions is previously determined by calculating eigenvalues of the inclusions, an inclusion possessing a magnetic nature if its eigenvalue is positive and an electric nature if it is negative.

6. A method according to claim 4, wherein the inclusions are also listed within each of the first and second categories as a function of their geometrical shapes, and the step of selecting the metamaterial inclusion further comprises defining a geometrical shape of the selected antenna, the selection also being made as a function of the geometrical shape of the selected antenna.

7. A method according to claim 6, wherein selecting a metamaterial inclusion from a list of inclusions includes defining the geometrical shape of the selected antenna, with the selection also being made as a function of the geometrical shape of the selected antenna.

8. A computer system comprising means configured to perform a method of improving the efficiency of an electrically small antenna comprising the following steps:
   selecting an antenna;

electrically feeding said selected antenna;

quantifying the energy stored in the selected antenna at a given transmission frequency;

determining the nature of the selected antenna as a function of the quantified stored energy, this determination comprising comparing said quantity of stored energy with an energy threshold, the selected antenna being of electric nature if the quantified stored energy is below the energy threshold, and otherwise being of magnetic nature; and selecting a metamaterial inclusion for associating with the selected antenna in order to improve its efficiency, the selection being made from a list of inclusions as a function of the nature of the selected antenna.

9. A computer program product that is directly loadable into a memory of a computer system, the computer program product including software code portions for executing a method of improving the efficiency of an electrically small antenna comprising the following steps:

selecting an antenna;

electrically feeding said selected antenna;

quantifying the energy stored in the selected antenna at a given transmission frequency;

determining the nature of the selected antenna as a function of the quantified stored energy, this determination comprising comparing said quantity of stored energy with an energy threshold, the selected antenna being of electric nature if the quantified stored energy is below the energy threshold, and otherwise being of magnetic nature; and selecting a metamaterial inclusion for associating with the selected antenna in order to improve its efficiency, the selection being made from a list of inclusions as a function of the nature of the selected antenna, when said program is executed on said computer system.

10. A non-transitory computer readable medium readable by a computer system having computer-executable instructions adapted to cause the computer system to execute a method of improving the efficiency of an electrically small antenna comprising the following steps:

selecting an antenna;

electrically feeding said selected antenna;

quantifying the energy stored in the selected antenna at a given transmission frequency;

determining the nature of the selected antenna as a function of the quantified stored energy, this determination comprising comparing said quantity of stored energy with an energy threshold, the selected antenna being of electric nature if the quantified stored energy is below the energy threshold, and otherwise being of magnetic nature; and selecting a metamaterial inclusion for associating with the selected antenna in order to improve its efficiency, the selection being made from a list of inclusions as a function of the nature of the selected antenna.

\* \* \* \* \*